(12) United States Patent
Jiang et al.

(10) Patent No.: US 11,917,154 B2
(45) Date of Patent: Feb. 27, 2024

(54) END-TO-END NEURAL COMPRESSION WITH DEEP REINFORCEMENT LEARNING

(71) Applicant: TENCENT AMERICA LLC, Palo Alto, CA (US)

(72) Inventors: Wei Jiang, Sunnyvale, CA (US); Wei Wang, Palo Alto, CA (US); Sheng Lin, San Jose, CA (US); Shan Liu, San Jose, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 97 days.

(21) Appl. No.: 17/476,859

(22) Filed: Sep. 16, 2021

(65) Prior Publication Data
US 2022/0210416 A1   Jun. 30, 2022

Related U.S. Application Data

(60) Provisional application No. 63/131,670, filed on Dec. 29, 2020.

(51) Int. Cl.
*H04N 19/124* (2014.01)
*H04N 19/91* (2014.01)
(Continued)

(52) U.S. Cl.
CPC ........... *H04N 19/124* (2014.11); *G06N 3/045* (2023.01); *G06N 3/08* (2013.01); *H04N 19/91* (2014.11)

(58) Field of Classification Search
CPC .... H04N 19/124; H04N 19/91; H04N 19/147; H04N 19/172; H04N 19/13;
(Continued)

(56) References Cited

U.S. PATENT DOCUMENTS

| 10,356,413 B1 * | 7/2019 | Sim ...................... H04N 19/12 |
| 10,930,263 B1 * | 2/2021 | Mahyar ................. G06N 3/088 |

(Continued)

FOREIGN PATENT DOCUMENTS

| CN | 112435306 A | * | 3/2021 |
| EP | 4 059 219 A1 | | 9/2022 |

(Continued)

OTHER PUBLICATIONS

International Search Report dated Dec. 23, 2021 from the International Searching Authority in International Application No. PCT/US2021/051953.

(Continued)

*Primary Examiner* — Joseph Suh
(74) *Attorney, Agent, or Firm* — Sughrue Mion, PLLC

(57) ABSTRACT

End-to-end neural image compression using deep reinforcement learning (DRL) is performed by at least one processor and includes encoding an input, generating encoded representations of the input, generating a set of quantization keys using a first neural network, based on a set of previous quantization states, wherein each quantization key in the set of quantization keys and each previous quantization state in the set of previous quantization states correspond to the encoded representations of the input, generating a set of dequantized numbers representing dequantized representations of the encoded representations of the input, based on the set of quantization keys, using a second neural network, and generating a reconstructed output, based on the set of dequantized numbers.

20 Claims, 12 Drawing Sheets

(51) Int. Cl.
*G06N 3/08* (2023.01)
*G06N 3/045* (2023.01)

(58) Field of Classification Search
CPC ........ H04N 19/423; G06N 3/045; G06N 3/08; G06N 3/084; G06T 9/002; G06T 2207/20084
See application file for complete search history.

(56) References Cited

U.S. PATENT DOCUMENTS

| | | | |
|---|---|---|---|
| 11,190,760 B1* | 11/2021 | Zhao | G06N 3/045 |
| 11,276,180 B1* | 3/2022 | Gluckman | H04N 19/567 |
| 11,386,582 B1* | 7/2022 | Tissera | G06T 9/002 |
| 2019/0098305 A1* | 3/2019 | Fu | H04N 19/119 |
| 2019/0132591 A1* | 5/2019 | Zhang | H04N 19/59 |
| 2019/0149823 A1* | 5/2019 | Lim | H04N 19/70 375/240.03 |
| 2019/0370638 A1* | 12/2019 | Green | G06N 3/08 |
| 2020/0051288 A1* | 2/2020 | Lim | H04N 19/11 |
| 2020/0099733 A1* | 3/2020 | Chu | H04N 21/8456 |
| 2020/0244969 A1 | 7/2020 | Bhorkar | |
| 2020/0258120 A1* | 8/2020 | Ardulov | G06F 18/251 |
| 2021/0006794 A1* | 1/2021 | Karczewicz | H04N 19/126 |
| 2021/0058620 A1* | 2/2021 | Ramasubramonian | H04N 19/124 |
| 2021/0067785 A1* | 3/2021 | Zhang | H04N 19/159 |
| 2021/0146531 A1* | 5/2021 | Tremblay | G06N 20/00 |
| 2021/0183374 A1* | 6/2021 | Thomson | G10L 15/30 |
| 2021/0201117 A1* | 7/2021 | Ha | G06N 3/08 |
| 2021/0264254 A1* | 8/2021 | Yoo | G06N 3/045 |
| 2021/0352324 A1* | 11/2021 | Zhao | H04N 19/70 |
| 2021/0409682 A1* | 12/2021 | Guyon | H04N 19/186 |
| 2022/0038701 A1* | 2/2022 | Krishna | H04N 19/184 |
| 2022/0232219 A1* | 7/2022 | Zhao | H04N 19/119 |

FOREIGN PATENT DOCUMENTS

| | | |
|---|---|---|
| EP | 4 062 376 A1 | 9/2022 |
| WO | 2019/115865 A1 | 6/2019 |
| WO | 2020/150942 A1 | 7/2020 |
| WO | 2022/115155 A1 | 6/2022 |
| WO | 2022/146523 A1 | 7/2022 |

OTHER PUBLICATIONS

Written Opinion dated Dec. 23, 2021 from the International Searching Authority in International Application No. PCT/US2021/051953.

Extended European Search Report dated Feb. 2, 2023, issued in European Application No. 21916120.5.

Xiaotong Lu et al., "Learning a Deep Vector Quantization Network for Image Compression", IEEE Access, 2019, vol. 7, pp. 118815-118825 (11 pages).

Guarda et al., "Neighborhood Adaptive Loss Function for Deep Learning-Based point Cloud Coding With Implicit and Explicit Quantization", IEEE MultiMedia, 2021, pp. 107-116 (10 pages).

* cited by examiner

END-TO-END NEURAL COMPRESSION WITH DEEP REINFORCEMENT LEARNING

CROSS-REFERENCE TO RELATED APPLICATION

This application is based on and claims priority to U.S. Provisional Patent Application No. 63/131,670, filed on Dec. 29, 2020, the disclosure of which is incorporated by reference herein in its entirety.

BACKGROUND

The process of an End-to-End Neural Compression (E2ENC) can be describe as follows. Given an input image or video sequence x, based on the input x, a DNN Encoder computes a compact representation y that is quantized into a discrete-valued quantized representation $\bar{y}$. This discrete-valued quantized representation $\bar{y}$ can then be entropy encoded losslessly for easy storage and transmission. On the decoder side, the discrete-valued quantized representation $\bar{y}$ can be recovered from lossless entropy decoding, and is used as the input to a DNN Decoder to reconstruct an image or video sequence z.

In this process, quantization is a core step, which is also one main source of compression quality loss. Improving quantization efficiency can bring large performance gain in all image and video compression tasks.

SUMMARY

According to embodiments, a method of multi-quality loop filter video compression using a masked multi-task neural network, based on micro-structured parameter sharing is performed by at least one processor and includes. a method of end-to-end neural image compression using deep reinforcement learning, is performed by at least one processor and includes encoding an input, generating a plurality of encoded representations of the input, generating a set of quantization keys, using a first neural network, based on a set of previous quantization states, wherein each quantization key in the set of quantization keys and each previous quantization state in the set of previous quantization states correspond to the plurality of encoded representations, generating a set of dequantized numbers representing dequantized representations of the plurality of encoded representations, based on the set of quantization keys, using a second neural network, and generating a reconstructed output, based on the set of dequantized numbers.

According to embodiments, an apparatus for end-to-end neural image compression using deep reinforcement learning including at least one memory configured to store program code and at least one processor configured to read the program code and operate as instructed by the program code. The program code includes encoding code configured to cause the at least one processor to encode an input, first generating code configured to cause the at least one processor to generate a plurality of encoded representations of the input, second generating code configured to cause the at least one processor to generate a set of quantization keys, using a first neural network, based on a set of previous quantization states, wherein each quantization key in the set of quantization keys and each previous quantization state in the set of previous quantization states correspond to the plurality of encoded representations, third generating code configured to cause the at least one processor to generate a set of dequantized numbers representing dequantized representations of the plurality of encoded representations, based on the set of quantization keys, using a second neural network, and decoding code configured to cause the at least one processor to decode a reconstructed output, based on the set of dequantized numbers.

According to embodiments, a non-transitory computer-readable medium storing instructions for that, when executed by at least one processor for end-to-end neural image compression using deep reinforcement learning, cause the at least one processor to encode an input, generate a plurality of encoded representations of the input, generate a set of quantization keys, using a first neural network, based on a set of previous quantization states, wherein each quantization key in the set of quantization keys and each previous quantization state in the set of previous quantization states correspond to the plurality of encoded representations, generate a set of dequantized numbers representing dequantized representations of the plurality of encoded representations, based on the set of quantization keys, using a second neural network, and decode a reconstructed output, based on the set of dequantized numbers.

DETAILED DESCRIPTION

Figure 1:
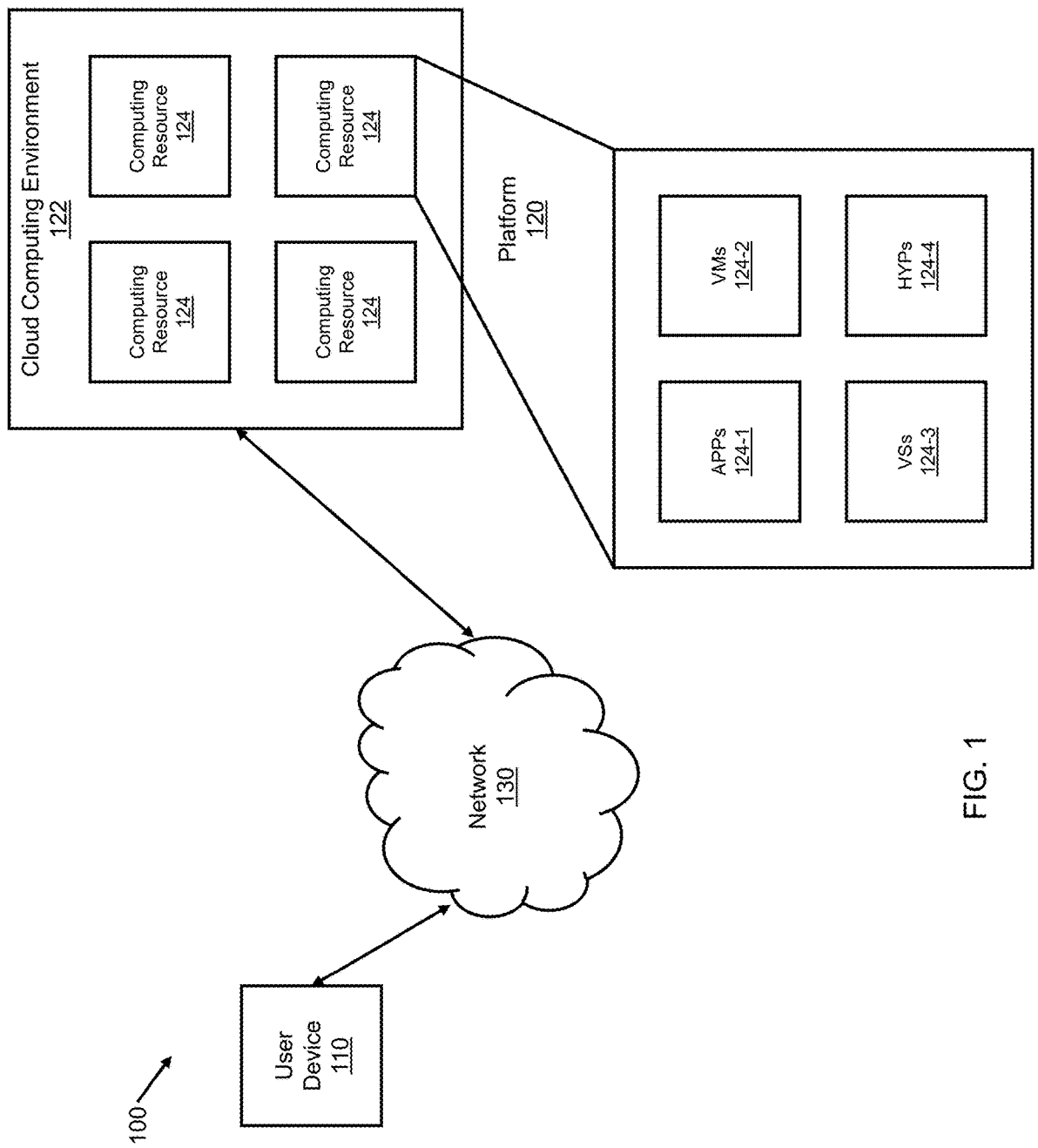
FIG. 1 is a diagram of an environment in which methods, apparatuses and systems described herein may be implemented, according to embodiments.

Embodiments may relate to a framework of End-to-End Neural Compression (E2ENC) using Deep Reinforcement Learning (DRL). The method considers the optimization of the entire compression process jointly in the context of neural compression, and also supports various types of learning-based quantization methods. In the drawings, modules with the same processes and/or operations are denoted by the same reference numbers, and thus a repeated description may be omitted as needed.

Figure 3:
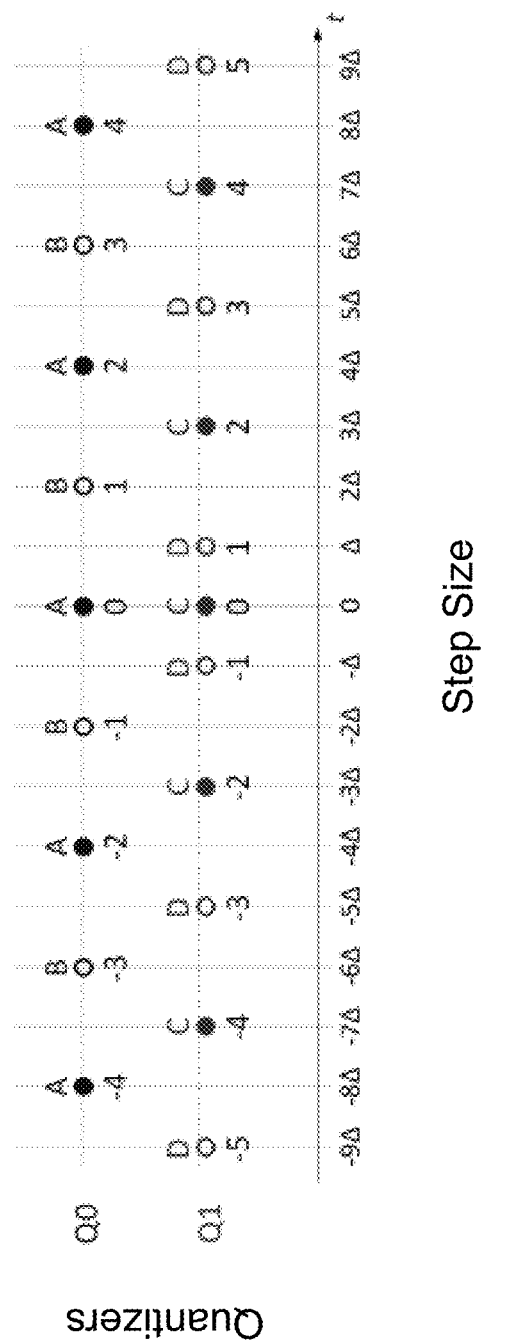
FIG. 3 is a diagram of a dependent quantization (DQ) mechanism using two quantizers in a DQ design.

Traditional image and video coding standards use Dependent Quantization (DQ) or trellis-coded quantization with hand-designed quantization rules. DQ comprises of two quantizers $Q_0$ and $Q_1$ and a procedure for switching between them. FIG. 3 gives an example illustration of a DQ mechanism using quantizers $Q_0$ and $Q_1$ in the DQ design. The labels above the circles show the associated states and the label below the circles show the associated quantization keys. On the decoder side, a reconstructed number x' is determined by an integer key k multiplying a quantization step size Δ for either of the quantizers $Q_0$ or $Q_1$. The switching between quantizers $Q_0$ and $Q_1$ can be represented by a state machine with $M=2^K$ DQ states, K≥2 (hence M≥4), where each DQ state is associated with one of the quantizers $Q_0$ or $Q_1$. The current DQ state is uniquely determined by the previous DQ state and the value of the current quantization key $k_i$. For encoding an input stream $x_1, x_2, \ldots$ the potential transitions between quantizers $Q_0$ and $Q_1$ can be illustrated by a trellis with $2^K$ DQ states. Thus, selecting the optimal sequence of quantization keys $k_1, k_2, \ldots$ is equivalent to finding the trellis path with the minimum Rate-Distortion (R-D) cost. The problem can be solved by the Viterbi algorithm.

Figures 4A, 4B:
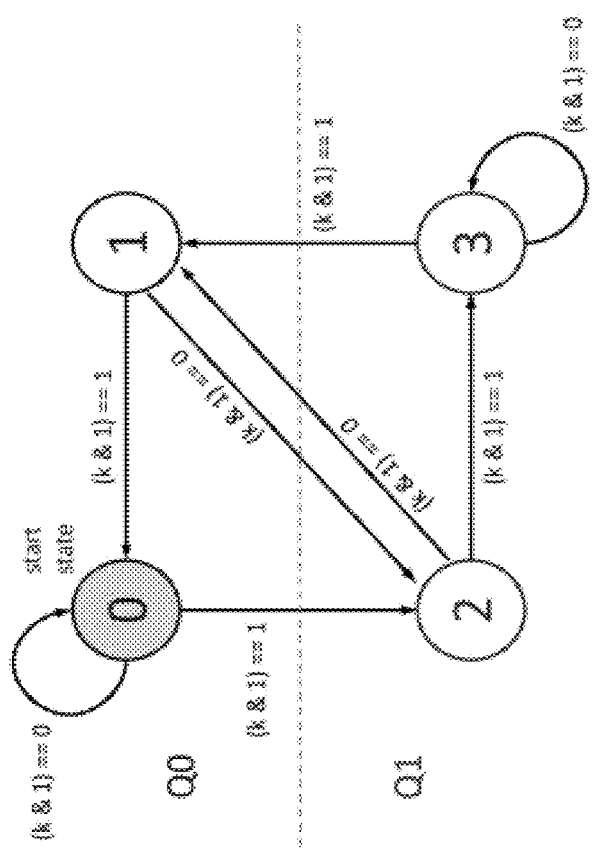
FIG. 4(a) is a state diagram of a hand-designed state machine illustrating the switching between the two quantizers in the DQ design.
FIG. 4(b) is a state table representing the state diagram of the hand-designed state machine of FIG. 4(a).

Traditionally, the state machine is hand designed empirically. FIG. 4 gives an example of the hand-designed state machine used in the VVC standard with four states. Specifically, FIG. 4(a) is a state diagram of the hand-designed state machine. FIG. 4(b) is a state table representing the state diagram of the hand-designed state machine.

There are three major limitations of the traditional DQ method. First, only two quantizers are used. If the number of quantizers are increased, the bit consumption in encoding the numbers can be reduced. Second, hand-designing the state-machine is not optimal and too expensive to include a large number of DQ states. Increasing the number of quantizers requires increasing the number of DQ states, which can improve the quantization efficiency, but will result in a state machine too complicated to be hand-designed. Finally, the method of key generation and number reconstruction is heuristically designed manually, which is also not optimal. Searching for other better methods requires domain expertise and can be too expensive to be manually designed.

Accordingly, embodiments of the present disclosure may relate to learning-based quantization that is learned by the Deep Reinforcement Learning (DRL) mechanism. Embodiments may flexibly support various types of quantization methods (e.g., uniform quantization, codebook-based quantization, or deep learning based quantization), and learns the optimal quantizer in a data-driven manner. In addition, embodiments may relate to the entire compression process jointly in the context of neural compression, where the DNN Encoder, DNN Decoder and the learning-based quantization methods can be jointly optimized to provide improved data adaptive compression results.

FIG. 1 is a diagram of an environment 100 in which methods, apparatuses and systems described herein may be implemented, according to embodiments.

As shown in FIG. 1, the environment 100 may include a user device 110, a platform 120, and a network 130. Devices of the environment 100 may interconnect via wired connections, wireless connections, or a combination of wired and wireless connections.

The user device 110 includes one or more devices capable of receiving, generating, storing, processing, and/or providing information associated with platform 120. For example, the user device 110 may include a computing device (e.g., a desktop computer, a laptop computer, a tablet computer, a handheld computer, a smart speaker, a server, etc.), a mobile phone (e.g., a smart phone, a radiotelephone, etc.), a wearable device (e.g., a pair of smart glasses or a smart watch), or a similar device. In some implementations, the user device 110 may receive information from and/or transmit information to the platform 120.

The platform 120 includes one or more devices as described elsewhere herein. In some implementations, the platform 120 may include a cloud server or a group of cloud servers. In some implementations, the platform 120 may be designed to be modular such that software components may be swapped in or out. As such, the platform 120 may be easily and/or quickly reconfigured for different uses.

In some implementations, as shown, the platform 120 may be hosted in a cloud computing environment 122. Notably, while implementations described herein describe the platform 120 as being hosted in the cloud computing environment 122, in some implementations, the platform 120 may not be cloud-based (i.e., may be implemented outside of a cloud computing environment) or may be partially cloud-based.

The cloud computing environment 122 includes an environment that hosts the platform 120. The cloud computing environment 122 may provide computation, software, data access, storage, etc. services that do not require end-user (e.g., the user device 110) knowledge of a physical location and configuration of system(s) and/or device(s) that hosts the platform 120. As shown, the cloud computing environment 122 may include a group of computing resources 124 (referred to collectively as "computing resources 124" and individually as "computing resource 124").

The computing resource 124 includes one or more personal computers, workstation computers, server devices, or other types of computation and/or communication devices. In some implementations, the computing resource 124 may host the platform 120. The cloud resources may include compute instances executing in the computing resource 124, storage devices provided in the computing resource 124, data transfer devices provided by the computing resource 124, etc. In some implementations, the computing resource 124 may communicate with other computing resources 124 via wired connections, wireless connections, or a combination of wired and wireless connections.

As further shown in FIG. 1, the computing resource 124 includes a group of cloud resources, such as one or more applications ("APPs") 124-1, one or more virtual machines ("VMs") 124-2, virtualized storage ("VSs") 124-3, one or more hypervisors ("HYPs") 124-4, or the like.

The application 124-1 includes one or more software applications that may be provided to or accessed by the user device 110 and/or the platform 120. The application 124-1 may eliminate a need to install and execute the software applications on the user device 110. For example, the application 124-1 may include software associated with the platform 120 and/or any other software capable of being provided via the cloud computing environment 122. In some implementations, one application 124-1 may send/receive information to/from one or more other applications 124-1, via the virtual machine 124-2.

The virtual machine 124-2 includes a software implementation of a machine (e.g., a computer) that executes programs like a physical machine. The virtual machine 124-2 may be either a system virtual machine or a process virtual machine, depending upon use and degree of correspondence to any real machine by the virtual machine 124-2. A system virtual machine may provide a complete system platform that supports execution of a complete operating system ("OS"). A process virtual machine may execute a single program, and may support a single process. In some implementations, the virtual machine 124-2 may execute on behalf of a user (e.g., the user device 110), and may manage infrastructure of the cloud computing environment 122, such as data management, synchronization, or long-duration data transfers.

The virtualized storage 124-3 includes one or more storage systems and/or one or more devices that use virtualization techniques within the storage systems or devices of the computing resource 124. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

The hypervisor 124-4 may provide hardware virtualization techniques that allow multiple operating systems (e.g., "guest operating systems") to execute concurrently on a host computer, such as the computing resource 124. The hypervisor 124-4 may present a virtual operating platform to the guest operating systems, and may manage the execution of the guest operating systems. Multiple instances of a variety of operating systems may share virtualized hardware resources.

The network 130 includes one or more wired and/or wireless networks. For example, the network 130 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, or the like, and/or a combination of these or other types of networks.

The number and arrangement of devices and networks shown in FIG. 1 are provided as an example. In practice, there may be additional devices and/or networks, fewer devices and/or networks, different devices and/or networks, or differently arranged devices and/or networks than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g., one or more devices) of the environment 100 may perform one or more functions described as being performed by another set of devices of the environment 100.

Figure 2:
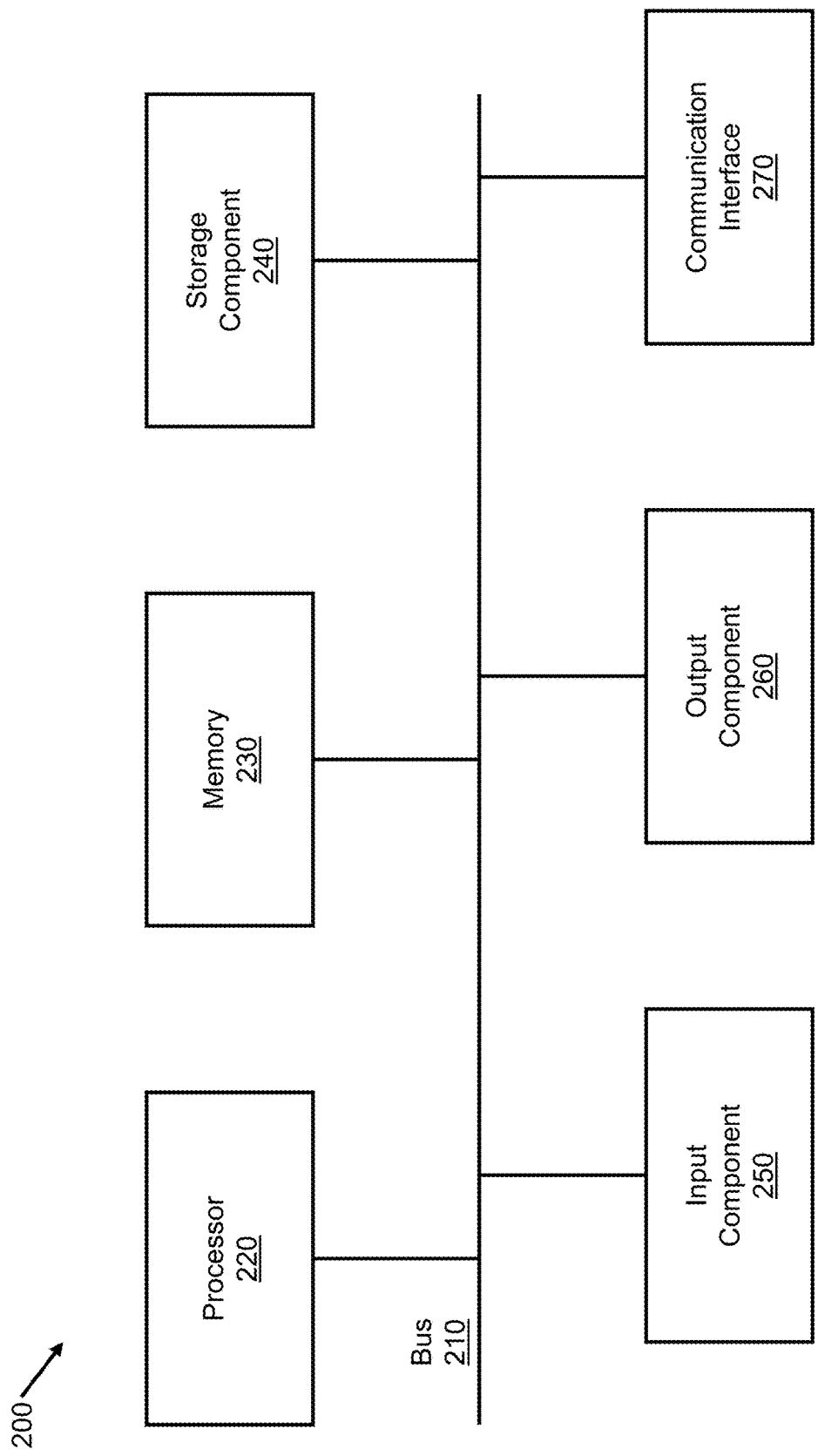
FIG. 2 is a block diagram of example components of one or more devices of FIG. 1.

FIG. 2 is a block diagram of example components of one or more devices of FIG. 1.

A device 200 may correspond to the user device 110 and/or the platform 120. As shown in FIG. 2, the device 200 may include a bus 210, a processor 220, a memory 230, a storage component 240, an input component 250, an output component 260, and a communication interface 270.

The bus 210 includes a component that permits communication among the components of the device 200. The processor 220 is implemented in hardware, firmware, or a combination of hardware and software. The processor 220 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, the processor 220 includes one or more processors capable of being programmed to perform a function. The memory 230 includes a random access memory (RAM), a read only memory (ROM), and/or another type of dynamic or static storage device (e.g., a flash memory, a magnetic memory, and/or an optical memory) that stores information and/or instructions for use by the processor 220.

The storage component 240 stores information and/or software related to the operation and use of the device 200. For example, the storage component 240 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

The input component 250 includes a component that permits the device 200 to receive information, such as via user input (e.g., a touch screen display, a keyboard, a keypad, a mouse, a button, a switch, and/or a microphone). Additionally, or alternatively, the input component 250 may include a sensor for sensing information (e.g., a global positioning system (GPS) component, an accelerometer, a gyroscope, and/or an actuator). The output component 260 includes a component that provides output information from the device 200 (e.g., a display, a speaker, and/or one or more light-emitting diodes (LEDs)).

The communication interface 270 includes a transceiver-like component (e.g., a transceiver and/or a separate receiver and transmitter) that enables the device 200 to communicate with other devices, such as via a wired connection, a wireless connection, or a combination of wired and wireless connections. The communication interface 270 may permit the device 200 to receive information from another device and/or provide information to another device. For example, the communication interface 270 may include an Ethernet interface, an optical interface, a coaxial interface, an infrared interface, a radio frequency (RF) interface, a universal serial bus (USB) interface, a Wi-Fi interface, a cellular network interface, or the like.

The device 200 may perform one or more processes described herein. The device 200 may perform these processes in response to the processor 220 executing software instructions stored by a non-transitory computer-readable medium, such as the memory 230 and/or the storage component 240. A computer-readable medium is defined herein as a non-transitory memory device. A memory device includes memory space within a single physical storage device or memory space spread across multiple physical storage devices.

Software instructions may be read into the memory 230 and/or the storage component 240 from another computer-readable medium or from another device via the communication interface 270. When executed, software instructions stored in the memory 230 and/or the storage component 240 may cause the processor 220 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 2 are provided as an example. In practice, the device 200 may include additional components, fewer components, different components, or differently arranged components than those shown in FIG. 2. Additionally, or alternatively, a set of components (e.g., one or more components) of the device 200 may perform one or more functions described as being performed by another set of components of the device 200.

A method and an apparatus for a general process of a neural compression system will now be described in detail with reference to FIG. 5 of the embodiment.

Figure 5:
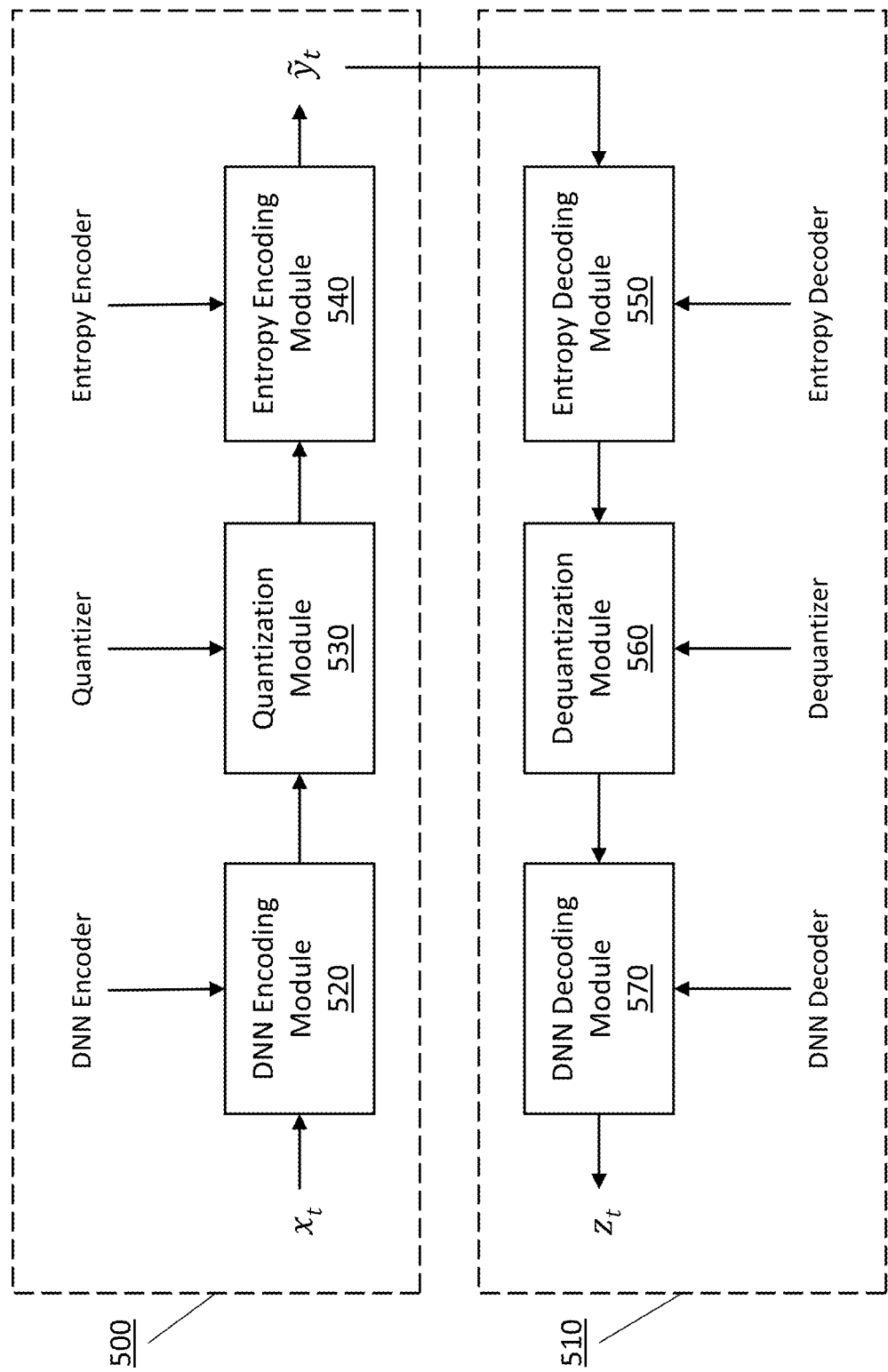
FIG. 5 is a block diagram of a general process of a neural compression system.

FIG. 5 is a block diagram of an apparatus for a general process of a neural compression system.

As shown in FIG. 5, the apparatus of the general process comprises of an Encoding Process 500 and a Decoding Process 510. The apparatus on the side of the Encoding Process 500 includes a DNN Encoding module 520, a Quantization module 530, and an Entropy Encoding module 540. The apparatus on the side of the Decoding Process 510 includes an Entropy Decoding module 550, a Dequantization module 560, and a DNN Decoding module 570.

Let $X=x_1, x_2, \ldots$ denote a sequence of input signals to be compressed, where a signal $x_t$ can be an image, a patch in an image, a video segment, a patch in a video segment, etc. The signal $x_t$ can be generally represented as a 4D tensor of size (h, w, c, d), e.g., an image of size (h, w, c) or a video sequence containing d image frames of size (h, w, c). A three step Encoding Process 500 will now be described. A DNN Encoding module 520 first computes a DNN encoded representation $y_t$, using a DNN Encoder, based on input signal $x_t$. Then a Quantization module 530 generates a quantized representation $\bar{y}_t$, using a Quantizer, based on the encoded representation $y_t$. Then, the Entropy Encoding module 540 encodes the quantized representation $\bar{y}_t$, by using an Entropy Encoder, into a compact representation $\hat{y}_t$ for easy storage and transmission. A corresponding three step Decoding Process 510 will now be described. After receiving the compact representation $\tilde{y}_b$, an Entropy Decoding module 550 recovers a decoded representation $\bar{y}'_t$, using an Entropy Decoder, based on the compact representation $\tilde{y}_t$. In embodiments, the lossless entropy coding method is used by the Entropy Encoder and Entropy Decoder, and therefore the decoded representation and the quantized representation are the same (i.e. $\bar{y}'_t = \bar{y}_t$). Then, a Dequantization module 560 computes a dequantized representation $y'_t$, using a Dequantizer, based on the decoded representation $\bar{y}'_t$. Finally, a DNN Decoding module 570 generates a reconstructed output $z_t$, using a DNN Decoder, based on the dequantized representation $y'_t$.

The overall target of the neural compression system is to minimize a Rate-Distortion (R-D) loss $L_{nc}(x_t, \bar{y}_t, z_t)$, so that the quantized representation $\bar{y}_t$ will have little bit consumption and the reconstructed output $z_t$ is close to the original input $x_t$: The Rate-Distortion (R-D) loss is computed according to the following equation:

$$L_{nc}(x_t, \bar{y}_t, z_t) = \lambda D_{nc}(x_t, z_t) + R_{nc}(\bar{y}_t) \qquad (1)$$

The distortion loss $D_{nc}(x_t, z_t)$ measures the reconstruction error, such as the PSNR and/or SSIM metric. The rate loss $R_{nc}(\bar{y}_t)$ is related to the bit rate of the quantized representation $\bar{y}_t$. The hyperparameter $\lambda$ balances the importance of these two loss terms. Further description of this equation, according to embodiments, will be detailed later.

Since the quantization/dequantization operations are generally not differentiable, the Quantizer/Dequantizer are optimized separately from the DNN Encoder/DNN Decoder. For example, previous methods assume linear quantization and approximate a differentiable rate loss $R_{nc}(\bar{y})$ through entropy estimation, so that the DNN Encoder/DNN Decoder can be learned through back-propagation.

A method and an apparatus for End-to-End Neural Compression (E2ENC) using Deep Reinforcement Learning (DRL) will now be described in detail.

The DNN Encoder and DNN Decoder as well as the Quantizer and Dequantizer of the E2ENC method of embodiments may be jointly learned. Specifically, Deep Reinforcement Learning (DRL) is exploited to combine the optimization of the DNN Encoder and DNN Decoder and the optimization of the Quantizer and Dequantizer. The proposed E2ENC framework is general and broad to accommodate different types of quantization methods and different types of DNN Encoder and DNN Decoder network architectures.

Figure 6:
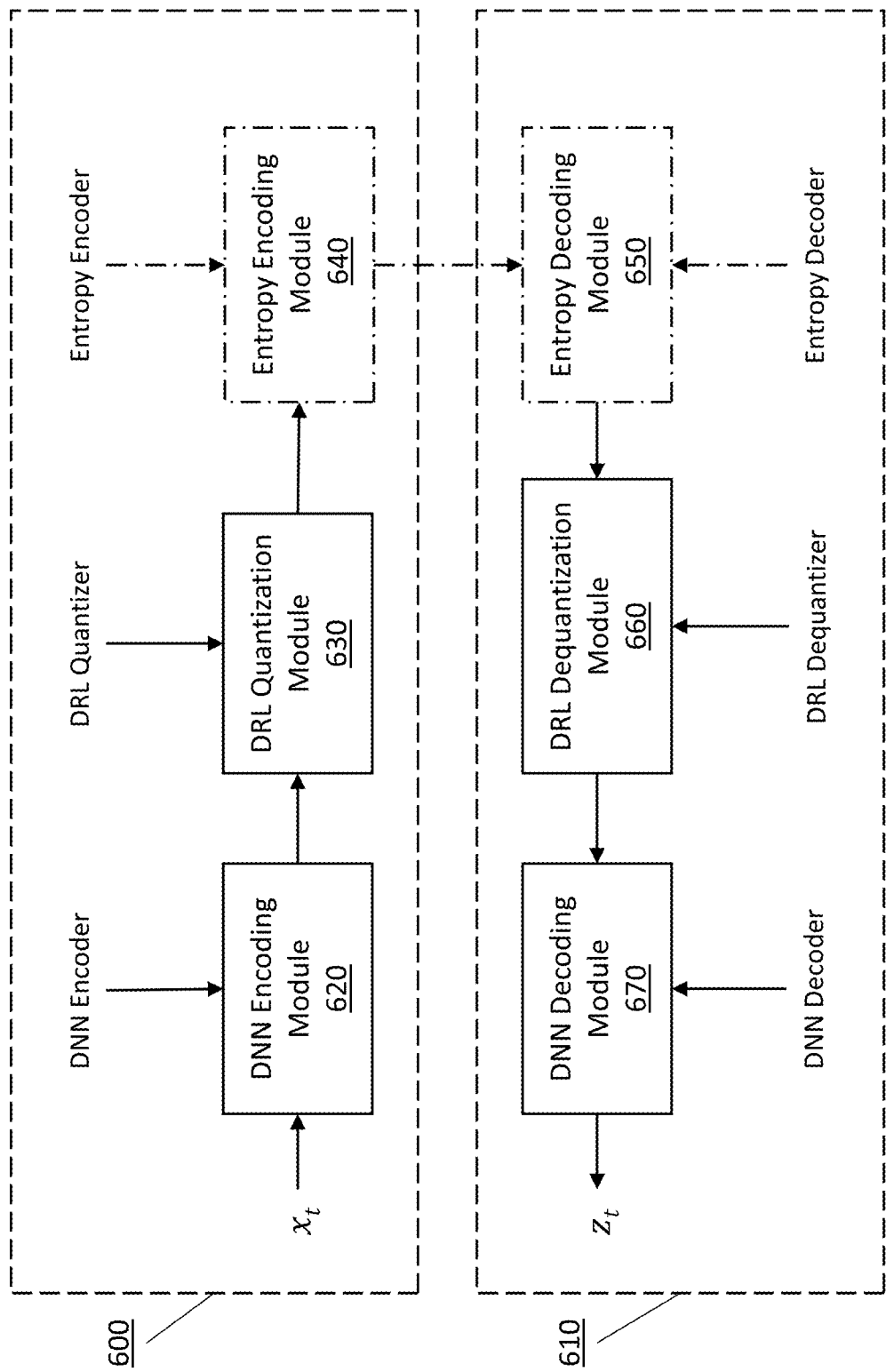
FIG. 6 is a block diagram of an End-to-End Neural Compression (E2ENC) apparatus, during a test stage, according to embodiments.

FIG. 6 is a block diagram of an E2ENC apparatus, during a test stage, according to embodiments.

As shown in FIG. 6, the E2ENC test apparatus includes an Encoding Side 600 comprising of the DNN Encoding module 620, a DRL Quantization module 630, and the Entropy Encoding module 640. The test apparatus of FIG. 6 also includes a Decoding Side 610 comprising of the Entropy Decoding module 650, a DRL Dequantization module 660, and the DNN Decoding module 670. The Encoding Side 600 and the Decoding Side 610 are encoding and decoding processes, respectively.

The Encoding Side 600 will now be described according to embodiments. Given the sequence of input signals $X=x_1, x_2, \ldots$, where each $x_t$ is generally represented as a 4D tensor of size (h, w, c, d), the DNN Encoding module 620 computes the DNN encoded representation $y_t$ based on the input signal $x_t$, by using the DNN Encoder. The DNN encoded representation $y_t$ can be viewed as a stream of numbers, $y_t = y_{t,1}, y_{t,2} \ldots$. For a batch of m numbers $Y_{t,i} = \ldots, y_{t,i-1}, y_{t,i}$, a DRL Quantization module 630 computes a batch of Quantization Keys (QKs) $K_{t,i} = \ldots, k_{t,i-1}, k_{t,i}$, each QK $k_{t,j}$ corresponding to each of the encoded representation $y_{t,i}$, by using a DRL Quantizer. For a 1-size batch (m=1), numbers are processed, individually, one by one. When m>1, numbers are quantized in an organized manner. The numbers can be organized in different orders. For example, the numbers can be organized block-wise to preserve the relative location information. Then the system sends the QKs $K_{t,i}$ to the Decoder and goes on to process the next batch of numbers $Y_{t,i+1}$. Optionally, the QKs $K_{t,i}$ will be further compressed by the Entropy Encoding module 640 (preferably in a lossless way) for easy storage and transmission.

The Decoding Side 610 will now be described according to embodiments. After receiving the QKs $K_{t,i}$, if the received QKs are entropy encoded, the Entropy Decoding module 650 is applied to obtain the entropy decoded QKs $\bar{K}_{t,i} = \ldots, \bar{k}_{t,i-1}, \bar{k}_{t,i}$ ($\bar{K}_{t,i} = K_{t,i}$ for lossless entropy coding). Then a DRL Dequantization module 660 recovers a batch of dequantized numbers $Y'_{t,i} = \ldots, y'_{t,i-1}, y'_{t,i}$ by using a DRL Dequantizer, which is a batch in the whole steam of the dequantized representation $y'_t$. Then, the DNN Decoding module 670 generates the reconstructed output $z_t$ based on the dequantized representation $y'_t$, by using the DNN Decoder. Note that the Entropy Encoding module 640 and Entropy Decoding module 650 are optional (marked by the dotted line in FIG. 6). When the Entropy Encoding module 640 and the Entropy Decoding module 650 are used, the embodiment takes lossless entropy coding methods, and therefore the entropy decoded QKs and the QKs computed by the DRL Quantization module 630 are the same (i.e. $\overline{K}_{t,i}=K_{t,i}$). Thus, hereafter, the same notation ($K_{t,i}$) will be used for QKs computed on both the Encoding Side 600 and the Decoding Side 610.

Figure 7:
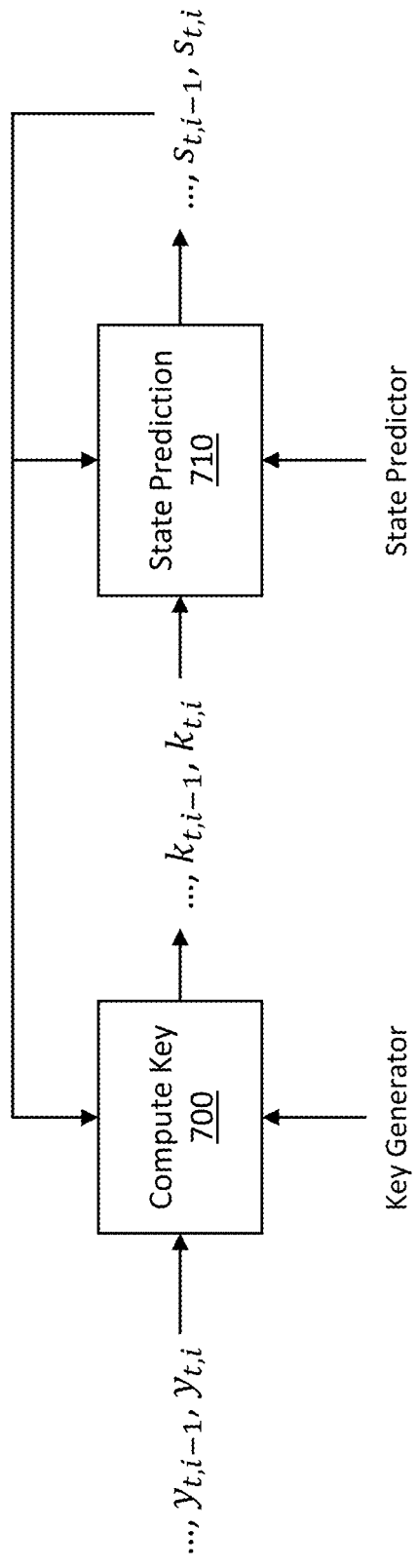
FIG. 7 is a detailed block diagram of a DRL Quantization module from the test stage apparatus in FIG. 6, during a test stage, according to embodiments.
Figure 8:
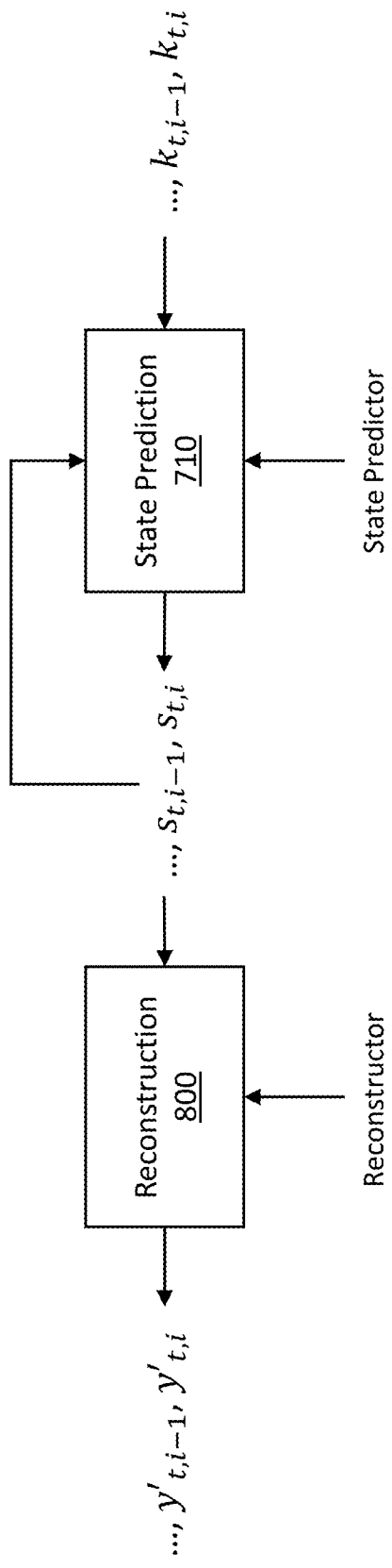
FIG. 8 is a detailed block diagram of a DRL Dequantization module from the test stage apparatus in FIG. 6, during a test stage, according to embodiments.

The DRL Quantizer and the DRL Dequantizer in FIG. 6 use learning-based quantization methods. FIG. 7 and FIG. 8 describe the detailed workflow of the DRL Quantization module 630 and the DRL Dequantization module 660, respectively.

As shown in FIG. 7, the DRL Quantization module 630 includes a Compute Key module 700 and a State Prediction module 710.

In the Encoding Side 600, given the batch of m numbers $Y_{t,i} = \ldots, y_{t,i-1}, y_{t,i}$, according to a batch of previous Quantization States (QSs) $S_{t,i-1} = \ldots, s_{t,i-2} s_{t,i-1}$, each QS $s_{t,i-1}$ corresponding to each of the encoded representation $y_{t,i}$, a Compute Key module 700 computes the QKs $K_{t,i} = \ldots, k_{t,i-1}, k_{t,i}$, each QK $k_{t,i}$ corresponding to each of the encoded representation $y_{t,i}$, by using a Key Generator. Then a State Prediction module 710 computes a current QSs $S_{t,i} = \ldots, s_{t,i-1}, s_{t,i}$ by using a State Predictor.

Given the previous QSs $S_{t,i-1}$, the Key Generator computes the QKs using a quantization method. This quantization method can be a predetermined rule-based method like uniform quantization with a fixed step size, where QK $k_{t,i}$ is the integer that can best reconstruct the corresponding encoded representation $y_{t,i}$ as the multiplication of the QK $k_{t,i}$ with the quantization step size. This quantization method can also be a statistic model like k-means where QK $k_{t,i}$ is the index of the cluster whose centroid can best reconstruct the corresponding encoded representation $y_{t,i}$. This disclosure does not put any restrictions on the specific quantization methods used as the Key Generator.

Given the previous QSs $S_{t,i-1}$ and the current QKs $K_{t,i}$, the State Prediction module 710 computes the current QS $s_{t,i}$. In one embodiment, only the latest QS $s_{t,i-1}$ is used by the State Prediction module 710, which is attached to each of the m QKs to form a pair, and all the m pairs are stacked together to form an input matrix of size (m, 2). In another embodiment, each QK and the corresponding QS form a pair ($k_{t,i}$, $s_{t,i-1}$), and the m pairs are stacked together to form an input matrix of size (m, 2). The State Prediction module 710 computes the current QS $s_{t,i}$ based on a State Predictor, which uses a learning-based model to support transition among an arbitrary number of possible states the QS can take. The learning-based model is trained through the Deep Q-Learning (DQN) algorithm which will be described in detail later.

As shown in FIG. 8, the DRL Dequantization module 660 includes the State Prediction module 710 and a Reconstruction module 800.

In the Decoding Side 610, after receiving the QKs $K_{t,i} = \ldots, k_{t,i-1}, k_{t,i}$, the State Prediction module 710 computes the current QS $s_{t,i}$ by using the State Predictor in the same way it is computed in the Encoding Side 600, based on the input QKs $K_{t,i}$ and previous QSs $S_{t,i-1} = \ldots, s_{t,i-2}, s_{t,i-1}$. Then, a Reconstruction module 800 computes the batch of dequantized numbers $Y'_{t,i} = \ldots, y'_{t,i-1}, y'_{t,i}$ based on the QKs $K_{t,i}$ and QSs $S_{t,i-1}$, by using a Reconstructor. The Reconstructor uses a dequantization method that corresponds to the quantization method used in the Key Generator. For example, when the quantization method is predetermined rule-based method like uniform quantization with a fixed step size, the dequantization method is also predetermined rule-based such as computing the dequantized number $y'_{t,i}$ as the multiplication of the QK $k_{t,i}$ with the quantization step size. When the quantization method is a statistic model like k-means, the dequantization method can be the centroid indexed by the QK $k_{t,i}$. This disclosure does not put any restrictions on the specific dequantization methods used as the Reconstructor.

The State Predictor is an action-value mapping function $f(a_j, v_j|K_{t,i}, S_{t,i-1})$ between an action $a_j$ and an output Q-value $v_j$ associated with the action, j=1, . . . , J (assuming J possible actions in total), given the QKs $K_{t,i}$ and QSs $S_{t,i-1}$. Each action $a_j$ corresponds to a possible state that QS $s_{t,i}$ can take. Given the current $K_{t,i}$ and $S_{t,i-1}$, the State Predictor computes the Q-values $v_j$ of all possible actions $a_j$, and selects the optimal action $a^*_j$ with the optimal Q-value $v^*_j$. The state corresponding to the optimal action $a^*_j$ is the QS $s_j$ the system selects. The Q-value is designed to measure the target compression performance associated with the sequence of actions. Therefore, selecting the optimal action gives the optimal target compression performance.

Figure 9:
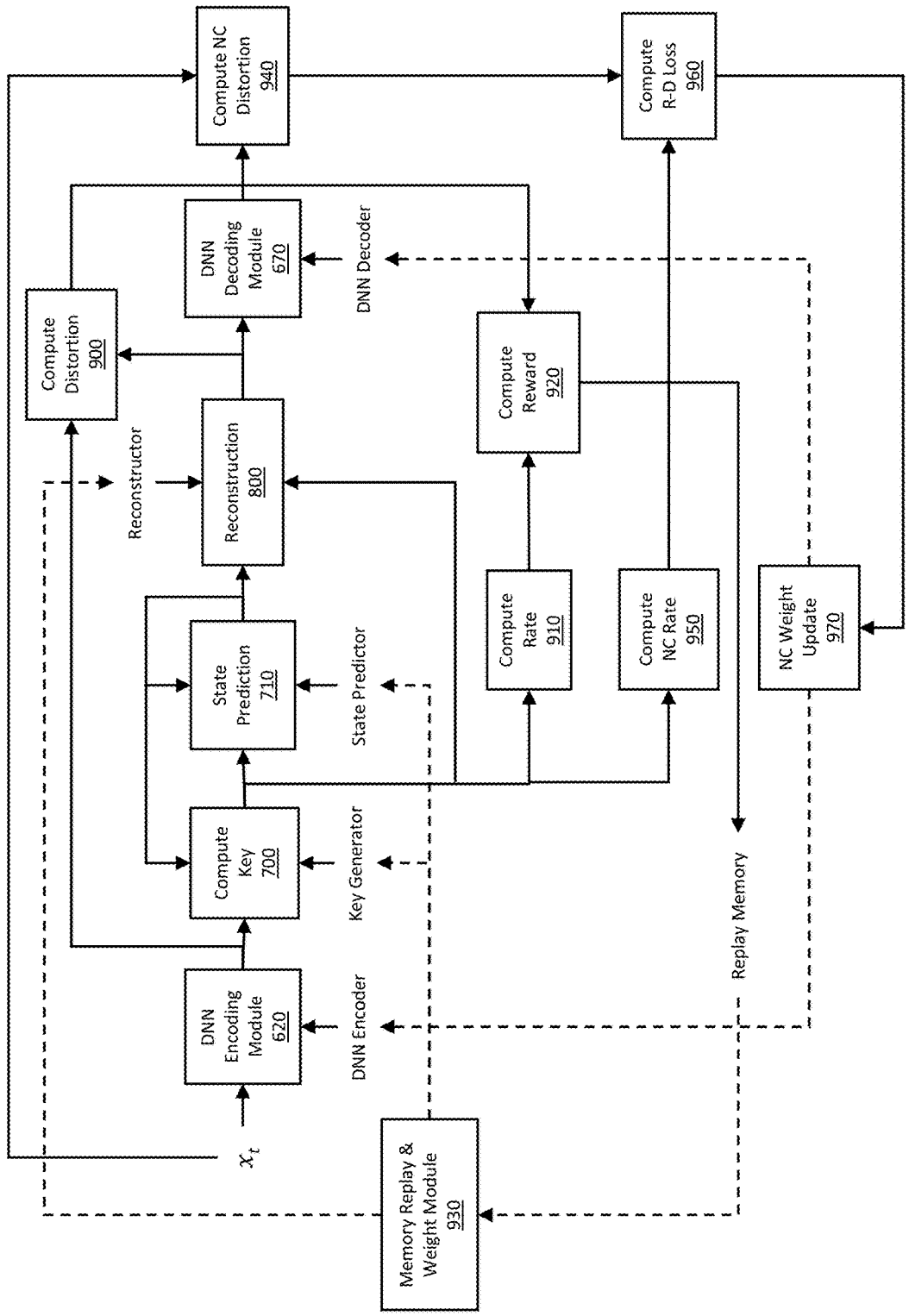
FIG. 9 is a workflow of the DRL Quantization module and the DRL Dequantization module workflow, during a training stage, according to embodiments.

The training process of the DRL Quantization module 630 and DRL Dequantization module 660 in the embodiment will now be described. An overall workflow of the training is shown in FIG. 9.

The Deep Q-learning mechanism, specifically the DQN algorithm, is used as the training method in the embodiment. DQN is an off-policy DRL method, which finds an optimal action selection policy for any given finite Markov Decision Process by learning the action-value mapping function to assign a reward Q-value to an action. A policy is a rule that the system follows in selecting actions. Given a current status, the learning agent may choose from a set of candidate actions, which result in different reward values. By experiencing various statuses and trying out various actions being at various statuses, the learning agent learns overtime to optimize the rewards so that it can behave optimally in the future at any given status it is in.

Specifically, a DNN is used as the State Predictor, which acts as a function approximator to estimate the action-value mapping function $f(a_j, v_j|K_{t,i}, S_{t,i-1})$. The State Predictor DNN typically comprises of a set of convolutional layers followed by one or multiple fully connected layers. This disclosure does not put any restrictions on the specific network architectures of the State Predictor.

Let State($t_s$-1) be the current State Predictor; let Key($t_k$-1) denote the current Key Generator; let Recon($t_r$-1) be the current Reconstructor; let Enc ($t_e$-1) be the current DNN Encoder; and let Dec($t_d$-1) be the current DNN Decoder. $t_s$, $t_k$, $t_r$, $t_e$, and $t_d$ can be different, so that the State Predictor, the Key Generator, the Reconstructor, the DNN Encoder and the DNN Decoder can be updated at different times with different updating frequencies.

As shown in FIG. 9, the E2ENC system training apparatus includes the DNN Encoding module 620, the DNN Decoding module 670, the Compute Key module 700, the State Prediction module 710, the Reconstruction module 800, a Compute Distortion module 900, a Compute Rate module 910, a Compute Reward module 920, a Memory Replay & Weight Update module 930, a Compute NC Distortion module 940, a Compute NC Rate module 950, a Compute R-D Loss module 960, and a NC Weight Update module 970.

Given the training sequence of input signals $X=x_1, x_2, \ldots$, for each signal $x_t$, the DNN Encoding module 620 uses the current DNN Encoder Enc($t_e$-1) to compute the DNN encoded representation $y_t=y_{t,1}, y_{t,2} \ldots$. For the batch of m numbers $Y_{t,i}= \ldots, y_{t,i-1}, y_{t,i}$, according to the previous QSs $S_{t,i-1}= \ldots, s_{t,i-2}, s_{t,i-1}$, the Compute Key module 700 computes the QKs $K_{t,i}= \ldots, k_{t,i-1}, k_{t,i}$, by using the current Key Generator Key($t_k$-1). The batch size and the way the numbers are organized are the same as the test stage. Then the State Prediction module 710 uses the current State Predictor State($t_s$-1) to compute the current QS $s_{t,i}$, based on the previous QSs $S_{t,i-1}$ and the current QKs $K_{t,i}$. The input of the State Prediction module 710 is also the same as the test stage. Then the Reconstruction module 800 uses the current Reconstructor Recon($t_r$-1) to compute the batch of dequantized numbers $Y'_{t,i}= \ldots, y'_{t,i-1}, y'_{t,i}$ based on the QKs $K_{t,i}$ and QSs $S_{t,i-1}$. Finally, the DNN Decoding module 670 generates the reconstructed $z_t$ based on $y'_t$ by using the current DNN Decoder Dec($t_d$-1).

In the training process, the State Predictor selects the optimal action $a^*_i$ using an $\epsilon$-greedy method. Specifically, after the current State Predictor State($t_s$-1) computes the Q-values $v_j$ of all possible actions $a_j$, with probability $\epsilon$ (a number between 0 and 1), a random action will be selected as the optimal action $a^*_i$, and with probability $(1-\epsilon)$, the optimal action $a^*_i$ with the optimal Q-value $v^*_i$ will be selected.

A Compute Distortion module 900 computes a distortion loss $D(Y_{t,i}, Y'_{t,i})$ to measure the difference between the original DNN encoded representation $Y_{t,i}$ and the decoded representation $Y'_{t,i}$. For example, the distortion loss $D(Y_{t,i}, Y'_{t,i})$ can be the average of the $L_k$-norm, e.g., $L_1$-norm as Mean Absolute Error and $L_2$-norm as Mean Square Error, of the difference between the corresponding elements in $Y_{t,i}$ and $Y'_{t,i}$:

$$D(Y_{t,i}, Y'_{t,i}) = \text{avg}_{l=i-m+1}{}^i \|y_{t,l} - y'_{t,l}\|^k \quad (2)$$

At the same time, a Compute Rate module 910 computes a rate loss $R(K_{t,i})$ to measure the bit consumption of the quantized representation, i.e., the computed QKs $K_{t,i}$ that are sent from the Encoder to Decoder. There are multiple ways to compute the rate loss. For example, the QKs may be compressed using any lossless entropy coding method and the actual bit count of the compressed bitstream is obtained as the rate loss.

For an adjacent batch of numbers $Y_{t,i}$ and $Y_{t,i+1}$, based on the distortion loss $D(Y_{t,i}, Y'_{t,i})$ and $D(Y_{t,i+1}, Y'_{t,i+1})$, and the rate loss $R(K_{t,i})$ and $R(K_{t,i+1})$, a Compute Reward module 920 computes a reward $\phi(Y_{t,i+1}, K_{t,i+1}, Y'_{t,i+1})$. The reward $\phi(Y_{t,i+1}, K_{t,i+1}, Y'_{t,i+1})$ measures the reward the State Predictor can get by taking the optimal action $a^*_i$ given the current QKs $K_{t,i}$ and QSs $S_{t,i-1}$:

$$\phi(Y_{t,i+1}, K_{t,i+1}, Y'_{t,i+1}) = D(Y_{t,i+1}, Y'_{t,i+1}) + aR(K_{t,i+1}) \quad (3)$$

where $\alpha$ is a hyperparameter to balance the rate loss and distortion in the reward. An experience $E\{\phi(Y_{t,i+1}, K_{t,i+1}, Y'_{t,i+1}), a^*_i, v^*_i, Y_{t,i}, S_{t,i-1}, K_{t,i}\}$, i.e., selecting action $a^*_i$ with associated Q-value $v^*_i$ based on QKs $K_{t,i}$ and QSs $S_{t,i-1}$ and then obtaining the reward $\phi(Y_{t,i+1}, K_{t,i+1}, Y'_{t,i+1})$, is added into a Replay Memory. The Replay Memory usually has a maximum storage limit and once it reaches its limit, the oldest experience will be replaced by the latest one.

Figure 10:
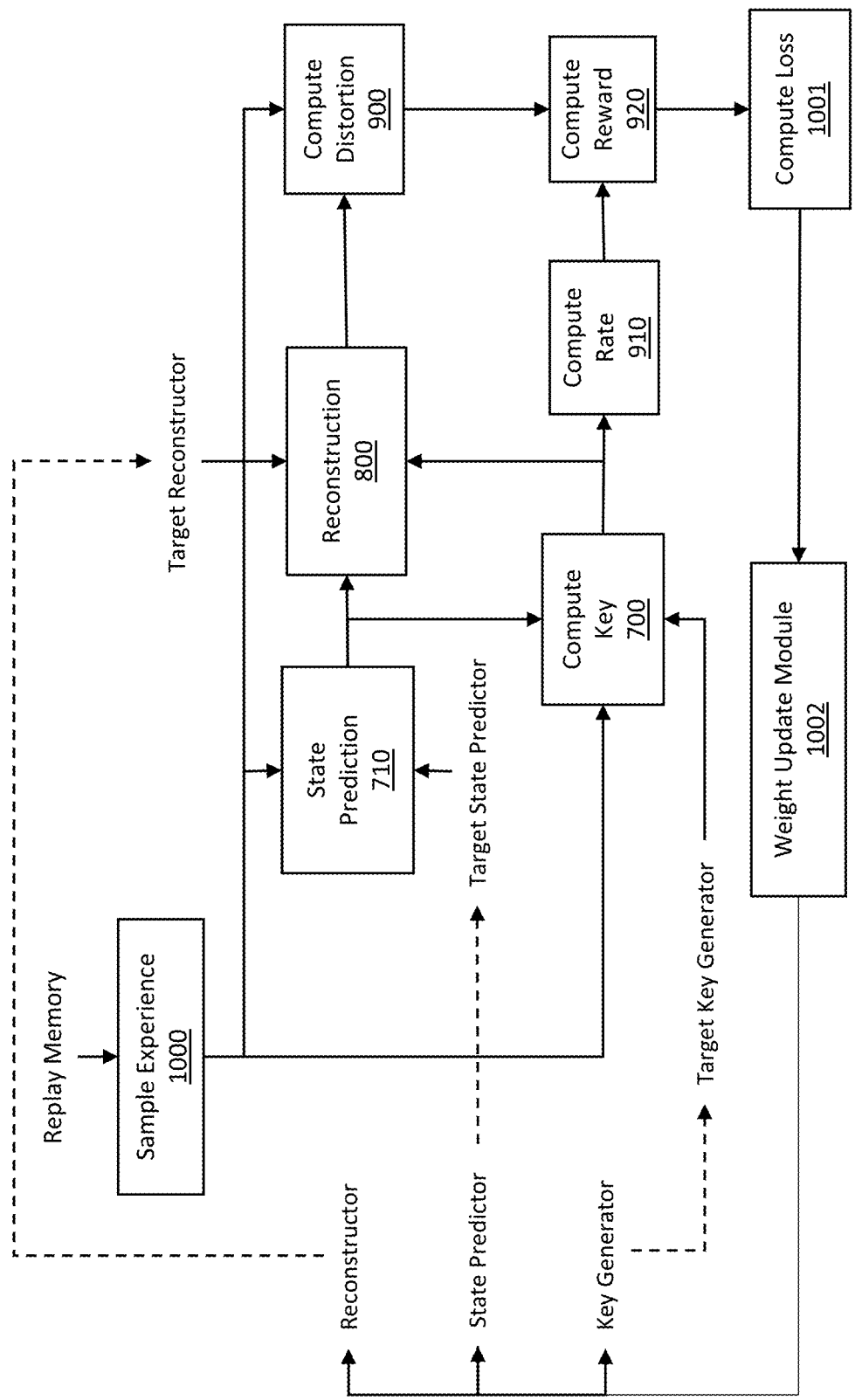
FIG. 10 is a detailed workflow of a Memory Replay & Weight Update module, during a training stage, according to embodiments.

When it is time to update the State Predictor, the Key Generator, and the Reconstructor, the system samples a batch of experiences from the Replay Memory, and uses these sampled experiences to update the model parameters in a Memory Replay & Weight Update module 930. FIG. 10 is a detailed workflow of the Memory Replay & Weight Update module 930 during a training stage.

As shown in FIG. 10, the Memory Replay & Weight Update module 930 includes a Sample Experience module 1000, a Compute Loss module 1001, a Weight Update module 1002, the Compute Key module 700, the State Prediction module 710, the Reconstruction module 800, the Compute Distortion module 900, the Compute Rate module 910, and the Compute Reward module 920.

During the training stage, a Target State Predictor State$^T$, a Target Key Generator Key$^T$ and a Target Reconstructor Recon$^T$ is maintained, having exactly the same model structure as the State Predictor, the Key Generator, and the Reconstructor, respectively. The only difference is the model parameters, such as the DNN weight coefficients of the State Predictor, or the k-means model parameter of the Key Generator when k-means quantization is used, or the DNN weight coefficients of the Key Generator when quantization is based on deep clustering. These model parameters are cloned from the corresponding State Predictor, Key Generator and Reconstructor at every $T_s$, $T_k$ and $T_r$ parameter updating cycles.

During each parameter updating cycle, the system samples a set of experiences from the Replay Memory $\langle E\{\phi(Y_{t,l+1}, K_{t,l+1}, Y'_{t,l+1}), a^*_l, v^*_l, Y_{t,l}, S_{t,l-1}, K_{t,l}\} \rangle$ in a Sample Experience module 1000. For each experience $E\{\phi(Y_{t,l+1}, K_{t,l+1}, Y'_{t,l+1}), a^*_l, v^*_l, Y_{t,l}, S_{t,l-1}, K_{t,l}\}$ the State Prediction module 710, the Target State Predictor State$^T$ predicts a target QS $\hat{s}_{t,l}$ based on the QKs $Y_{t,l}$ and QSs $S_{t,l-1}$ in the experience. Based on the target QS $\hat{s}_{t,l}$ and the Target Key Generator Key$^T$, the Compute Key module 700 computes a target key $\hat{K}_{t,l+1}$. Based on the target key $\hat{K}_{t,l+1}$ and the target QSs $\hat{S}_{t,l}$ and the Target Reconstructor Recon$^T$, the Reconstruction module 800 computes a batch of target dequantized numbers $\hat{Y}'_{t,l+1}= \ldots, \hat{y}'_{t,l}, \hat{y}'_{t,l+1}$. Then the Compute Distortion module 900 computes a target distortion $D(Y_{t,l+1}, \hat{Y}'_{t,l+1})$ between the original representation $Y_{t,l+1}$ in the experience and the decoded representation $\hat{Y}'_{t,l+1}$. The Compute Rate module 910 computes a target rate loss $R(\hat{K}_{t,l+1})$ based on $\hat{K}_{t,l+1}$. A target reward $\phi(Y_{t,l+1}, \hat{K}_{t,l+1}, \hat{Y}'_{t,l+1})$ is then computed in the Compute Reward module 920 as:

$$\phi(Y_{t,l+1}, \hat{K}_{t,l+1}, \hat{Y}'_{t,l+1}) = D(Y_{t,l+1}, \hat{Y}'_{t,l+1}) + aR(\hat{K}_{t,l+1}) \quad (4)$$

Then a Compute Loss module 1001 computes a target reward $T(a^*_{l+1}, Y_{t,l+1}, \hat{K}_{t,l+1}, \hat{Y}'_{t,l+1}, \hat{S}_{t,l})$ as:

$$T(a^*_{l+1}, Y_{t,l+1}, \hat{K}_{t,l+1}, \hat{Y}'_{t,l+1}, \hat{S}_{t,l}) = \phi(Y_{t,l+1}, \hat{K}_{t,l+1}, \hat{Y}'_{t,l+1}) + \gamma \max_j \hat{Q}(a^*_{l+1}, \hat{K}_{t,l+1}, \hat{S}_{t,l})$$

where $\hat{Q}(a^*_{l+1}, \hat{K}_{t,l+1}, \hat{S}_{t,l})$ is the Q-value predicted by the Target State Predictor State$^T$ for action $a^*_j$ given the QKs $\hat{K}_{t,l+1}$ and QSs $\hat{S}_{t,l}$. The hyperparameter $\gamma$ is the discount rate valued between 0 and 1, which determines how important the system weights long-term rewards against short-term ones. The smaller the discount rate, the system weights less on long-term rewards but cares only for the short-term rewards. Then the Compute Loss module 1001 computes a target loss $L(a^*_{l+1}, v^*_l, Y_{t,l+1}, \hat{K}_{t,l+1}, \hat{Y}'_{t,l+1}, \hat{S}_{t,l})$, based on $T(a^*_{l+1}, Y_{t,l+1}, \hat{K}_{t,l+1}, \hat{Y}'_{t,l+1}, \hat{S}_{t,l})$ and $v^*_l$ from the experience, e.g., $L_k$-norm of the difference between the two rewards, as:

$$L(a^*_{l+1}, v^*_l, Y_{t,l-1}, \hat{K}_{t,l+1}, \hat{Y}'_{t,l+1}, \hat{S}_{t,l}) = \|T(a^*_l, Y_{t,l}, S_{t,l-1}) - v^*_l\|^k \quad (6)$$

Then, a Weight Update module 1002 computes the gradient of the target loss, which is back-propagated to update the weight parameters of the DNNs of the State Predictor into State($t_s$). This loss can also be used in combine with the optimization objectives of the learning-based Key Generator and Reconstructor to update the Key Generator Key($t_k$) and the Reconstructor Recon($t_r$). For example, in the case where the Key Generator and Reconstructor use quantization methods based on deep clustering, weight parameters of the DNNs for the Key Generator and Reconstructor are updated through back-propagation. When other learning based methods are used for quantization, the model parameters are learned by optimizing an objective function, and this target loss $L(a*_{l+1}, v*_l, Y_{t,l+1}, \hat{K}_{t,l+1}, \hat{Y}'_{t,l+1}, \hat{S}_{t,l})$ can be weighted added to that optimization objective function as additional regularization terms to update the model parameters. As mentioned before, the State Predictor, the Key Generator, and the Reconstructor can be updated at different time stamps here.

For every $T_s$, $T_k$ and $T_r$ iterations, the weight parameters of the State Predictor, the Key Generator, and the Reconstructor will be cloned to the Target State Predictor State$^T$, the Target Key Generator Key$^T$, and the Target Reconstructor Recon$^T$, respectively.

The embodiment uses the Replay Memory and the Target State Predictor, Target Key Generator, and Target Reconstructor to stabilize the training process. The Replay Memory can have only one latest experience, which equals to not having a Replay Memory. Also, $T_s$, $T_k$ and $T_r$ can all equal to 1 so that the Target State Predictor, Target Key Generator, and Target Reconstructor will be updated for every iteration, which equals to not having another set of Target State Predictor, Target Key Generator, and Target Reconstructor.

As for the entire E2ENC system, for each input signal $x_t$, as described in FIG. 9, the DNN Encoding module 620 uses the current DNN Encoder Enc($t_e$−1) to compute the DNN encoded representation $y_t = y_{t,1}, y_{t,2}, \ldots$. Through the DRL Quantization module 630 and DRL Dequantization module 660, the dequantized representation $y'_t = y'_{t,1}, y'_{t,2}, \ldots$ are generated. And finally, the DNN Decoding module 670 generates the reconstructed $z_t$ based on $y'_t$ by using the current DNN Decoder Dec($t_d$−1). A Compute NC Distortion module 940 computes a neural compression distortion loss $D_{nc}(x_t, z_t)$ to measure the error introduced by the entire neural compression process, such as the PSNR and/or SSIM related metrics. A Compute NC Rate module 950 computes a neural compression rate loss $R_{nc}(\bar{y}_t)$, for example, by non-parametric density estimation based on the quantized representation $\bar{y}_t$ (i.e., the QKs $k_{t,1}, k_{t,2}, \ldots$ that are stored and transmitted to decoder) with a uniform density or normal density. Then, the overall R-D loss $L_{nc}(x_t, \bar{y}_t, z_t)$ is computed in the Compute R-D Loss module 960 as:

$$L_{nc}(x_t, \bar{y}_t, z_t) = \lambda D_{nc}(x_t, z_t) + R_{nc}(\bar{y}_t) \qquad (7)$$

Then, a NC Weight Update module 970 computes the gradient of the R-D loss (e.g., by summing up the gradient of the R-D loss over several input signals), which can be used through back-propagation to update the weight parameters of the DNN Encoder and the DNN Decoder into Enc($t_e$) and Dec($t_d$), respectively.

In embodiments, the DNN Encoder and DNN Decoder are pre-trained (denoted by Enc(0) and Dec(0) respectively), by assuming the uniform quantization method and estimating the neural compression rate loss $R_{nc}(\bar{y}_t)$ by an entropy estimation model. In such a pre-training process, given a pre-training input signal $x_t$, the DNN Encoder computes representation $y_t$, which is further used by the entropy estimation model to compute the neural compression rate loss $R_{nc}(\bar{y}_t)$. The DNN Decoder then computes the output $z_t$ based on the representation $y_t$. The neural compression distortion loss $D_{nc}(x_t, z_t)$ is computed and the overall R-D loss $L_{nc}(x_t, \bar{y}_t, z_t)$ is obtained, whose gradient can then be used to update the DNN Encoder and DNN Decoder through back-propagation.

When the pre-trained DNN Encoder and DNN Decoder are deployed, the training process described in FIG. 9 and FIG. 10 of the embodiment train the DRL Quantizer and DRL Dequantizer to cope with the DNN Encoder and DNN Decoder and improve the quantization performance. In embodiments, the training process described also update the DNN Encoder and DNN Decoder according to the current training data so that the entire neural compression system can adaptively improve the total compression performance. The update of the DNN Encoder and DNN Decoder can happen offline or online and can be permanent or temporary data dependent. Similarly, after deployed, the State Predictor, the Key Generator, and the Reconstructor in the DRL Quantizer and DRL Dequantizer can also be updated offline or online, permanently or temporarily data dependent. For example, in the case of video compression, to compress each video, the DNN Encoder, DNN Decoder, State Predictor, Key Generator, and Reconstructor can be updated based on the first few frames. But these updates will not be recorded to influence computation for future videos. Such updates can also be accumulated to a certain amount based on which these modules can be updated permanently to be applied to future videos.

Figure 11:
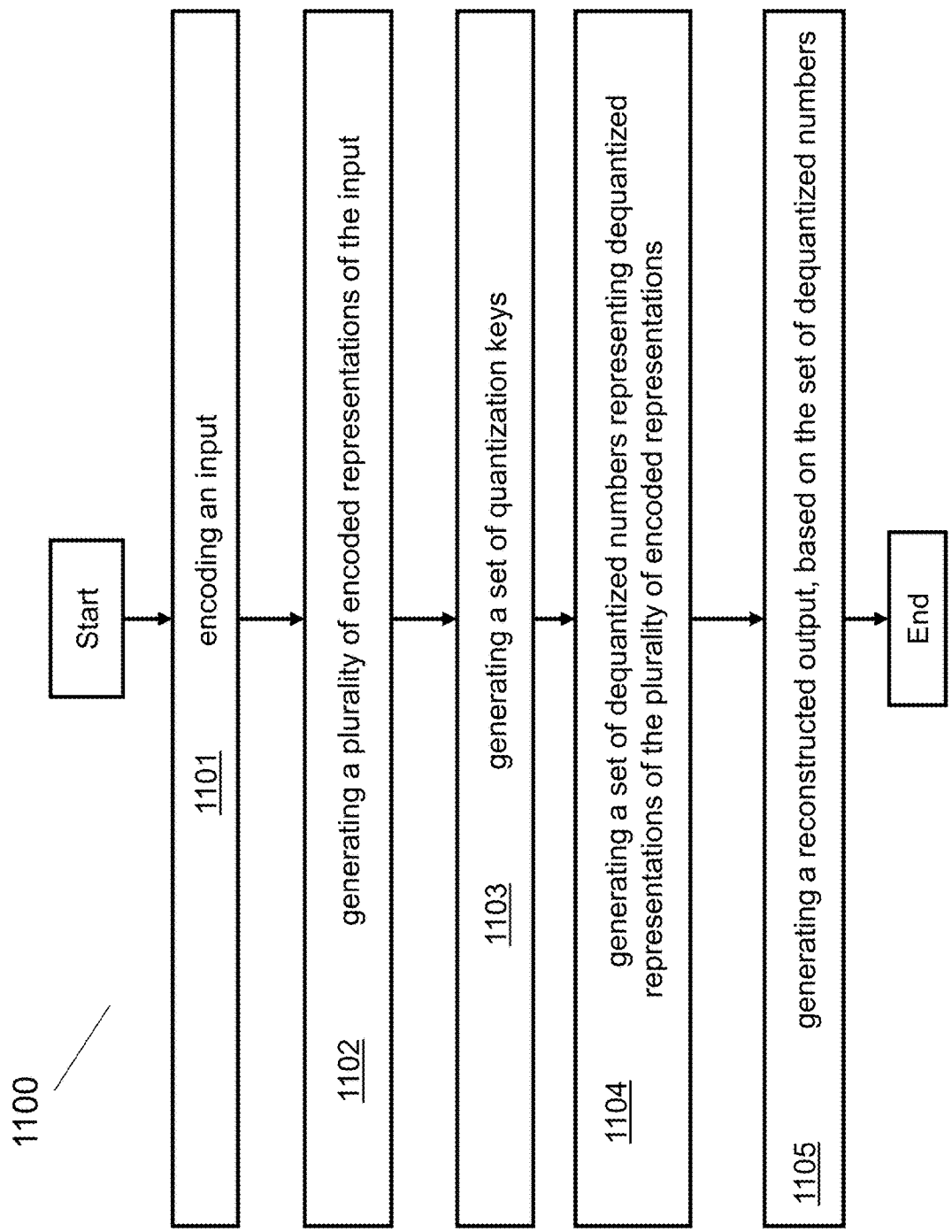
FIG. 11 is a flowchart of a method of end-to-end neural image compression using deep reinforcement learning, according to embodiments.

FIG. 11 is a flowchart of a method 1100 of end-to-end neural image compression using deep reinforcement learning, according to embodiments.

In some implementations, one or more process blocks of FIG. 11 may be performed by the platform 120. In some implementations, one or more process blocks of FIG. 11 may be performed by another device or a group of devices separate from or including the platform 120, such as the user device 110.

As shown in FIG. 11, in operation 1101, the method 1100 includes encoding an input, using a DNN encoder.

In operation 1102, the method 1100 includes generating a plurality of encoded representations of the input, where the plurality of encoded representations can be viewed as a stream of numbers.

In operation 1103, the method 1100 includes generating a set of quantization keys, using a first neural network, based on a set of previous quantization states, wherein each quantization key in the set of quantization keys and each previous quantization state in the set of previous quantization states correspond to the plurality of encoded representations. A set of encoded quantization keys may also be generated by entropy encoding the set of quantization keys. The first neural network being a DRL quantization neural network.

A set of current quantization states, based on the set of previous quantization states and the set of quantization keys, are generated by training the first neural network. The first neural network is trained by computing q-values for all possible actions, randomly selecting an action as an optimal action with an optimal q-value, generating a reward of the selected optimal action, sampling a set of selected optimal actions, and updating weight parameters of the first neural network to minimize distortion loss In operation 1104, the method 1100 includes generating a set of dequantized numbers representing dequantized representations of the plurality of encoded representations, based on the set of quantization keys, using a second neural network. If the set of encoded quantization keys are generated, a set of decoded quantization keys may also be generated by entropy decoding the set of encoded quantization keys and the set of dequantized numbers are instead generated based on the set of decoded quantization keys using the second neural network. The second neural network being a DRL dequantization neural network.

The set of quantization keys generated in operation 1103 and the set of dequantized numbers generated in operation 1104 are quantized and dequantized, respectively, using a block-wise quantization/dequantization method, individual quantization/dequantization method, or a static quantization/dequantization model method. Further, the quantization method of the set of quantization keys and the dequantization method of the set of dequantized numbers are the same.

In operation 1105, the method 1100 includes generating a reconstructed output, based on the set of dequantized numbers.

Although FIG. 11 shows example blocks of the method, in some implementations, the method may include additional blocks, fewer blocks, different blocks, or differently arranged blocks than those depicted in FIG. 11. Additionally, or alternatively, two or more of the blocks of the method may be performed in parallel.

Figure 12:
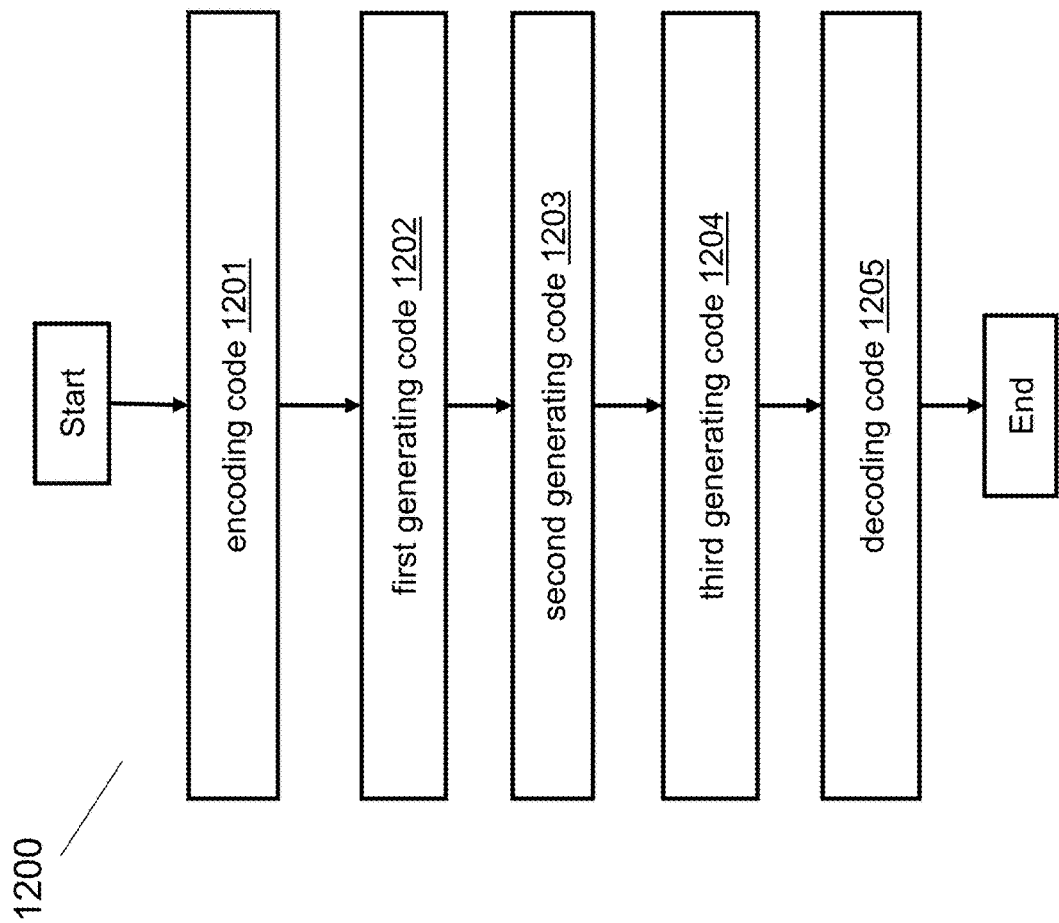
FIG. 12 is a block diagram of an apparatus for end-to-end neural image compression using deep reinforcement learning, according to embodiments.

FIG. 12 is a block diagram of an apparatus 1200 for end-to-end neural image compression using deep reinforcement learning, according to embodiments.

As shown in FIG. 12, the apparatus 1200 includes encoding code 1201, first generating code, second generating code, third generating code, decoding code.

The encoding code 1201 is configured to cause the at least one processor to encode an input, using a DNN encoder.

The first generating code 1202 is configured to cause the at least one processor to generate a plurality of encoded representations of the input where the plurality of encoded representations can be viewed as a stream of numbers.

The second generating code 1203 is configured to cause the at least one processor to generate a set of quantization keys, using a first neural network, based on a set of previous quantization states, wherein each quantization key in the set of quantization keys and each previous quantization state in the set of previous quantization states correspond to the plurality of encoded representations.

Further, the operations of the apparatus 1200 may also include state generating code configured to cause the at least one processor to generate a set of current quantization states, based on the set of previous quantization states and the set of quantization keys, by training the first neural network. The first neural network is trained by computing q-values for all possible actions, randomly selecting an action as an optimal action with an optimal q-value, generating a reward of the selected optimal action, sampling a set of selected optimal actions, and updating weight parameters of the first neural network to minimize distortion loss. The first neural network being a DRL quantization neural network.

The third generating code 1204 is configured to cause the at least one processor to generate a set of dequantized numbers representing dequantized representations of the plurality of encoded representations, based on the set of quantization keys, using a second neural network. A set of decoded quantization keys may also be generated by entropy decoding the set of encoded quantization keys and the set of dequantized numbers are instead generated based on the set of decoded quantization keys using the second neural network. The second neural network being a DRL dequantization neural network.

The set of quantization keys generated by the second generating code 1203 and the set of dequantized numbers generated by the third generating code 1204 are quantized and dequantized, respectively, using a block-wise quantization/dequantization method, individual quantization/dequantization method, or a static quantization/dequantization model method. Further, the quantization method of the set of quantization keys and the dequantization method of the set of dequantized numbers are the same.

The decoding code 1205 is configured to cause the at least one processor to decode a reconstructed output, based on the set of dequantized numbers.

Although FIG. 12 shows example blocks of the apparatus, in some implementations, the apparatus may include additional blocks, fewer blocks, different blocks, or differently arranged blocks than those depicted in FIG. 12. Additionally, or alternatively, two or more of the blocks of the apparatus may be combined.

Embodiments relate to an End-to-End Neural Compression (E2ENC) that improves compression performance by optimizing the neural compression as an entire system. This method provides the flexibility to adjust learning-based quantization and encoding methods, online or offline based on the current data, and support different types of learning-based quantization methods, including DNN-based or conventional model-based methods. The described method also provides a flexible and general framework that accommodates different DNN architectures.

The proposed methods may be used separately or combined in any order. Further, each of the methods (or embodiments) may be implemented by processing circuitry (e.g., one or more processors or one or more integrated circuits). In one example, the one or more processors execute a program that is stored in a non-transitory computer-readable medium.

The present disclosure provides illustration and description, but is not intended to be exhaustive or to limit the implementations to the precise form disclosed. Modifications and variations are possible in light of the present disclosure or may be acquired from practice of the implementations.

As used herein, the term component is intended to be broadly construed as hardware, firmware, or a combination of hardware and software.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein may be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method of end-to-end neural image compression using deep reinforcement learning, the method being performed by at least one processor, and the method comprising:
encoding an input;
generating a plurality of encoded representations of the input;
generating a set of quantization keys, using a first neural network, based on a set of previous quantization states, wherein each quantization key in the set of quantization keys and each previous quantization state in the set of previous quantization states correspond to the plurality of encoded representations;
generating a set of dequantized numbers representing dequantized representations of the plurality of encoded representations, based on the set of quantization keys, using a second neural network,
wherein the first neural network that is used to generate the set of quantization keys and the second neural network that is used to generate the set of dequantized numbers are updated using a first updating function,
wherein the encoder neural network and the decoder neural network are updated using a second updating function,
wherein the first updating function is different from the second updating function, and
wherein the first neural network used to generate the set of quantization keys, the second neural network used to generate the set of dequantized numbers, an encoder neural network, and a decoder neural network are jointly learned; and
generating a reconstructed output, based on the set of dequantized numbers.

2. The method of claim 1, wherein the plurality of encoded representations of the input are a stream of numbers.

3. The method of claim 1, further comprising:
generating a set of encoded quantization keys by entropy encoding the set of quantization keys; and
generating a set of decoded quantization keys by entropy decoding the set of encoded quantization keys,
wherein the set of dequantized numbers are generated based on the set of decoded quantization keys using the second neural network, and
wherein the second neural network is a DRL dequantization neural network.

4. The method of claim 1, further comprising:
generating the set of quantization keys using at least one of a block-wise quantization method, an individual quantization method, and a static quantization model method; and
generating the set of dequantized numbers using at least one of a block-wise dequantization method, an individual dequantization method, and a static dequantization model method.

5. The method of claim 4, wherein a quantization method of the set of quantization keys is same as a dequantization method of the set of dequantized numbers;
wherein based on the set of quantization keys using the block-wise quantization method as the quantization method, the set of dequantized numbers use the block-wise dequantization method as the dequantization method;
wherein based on the set of quantization keys using the individual quantization method as the quantization method, the set of dequantized numbers use the individual dequantization method as the dequantization method; and
wherein based on the set of quantization keys using the static quantization model method as the quantization method, the set of dequantized numbers use the static dequantization model method as the dequantization method.

6. The method of claim 1, further comprising generating a set of current quantization states, based on the set of previous quantization states and the set of quantization keys, by training the first neural network,
wherein the first neural network is a DRL quantization neural network.

7. The method of claim 6, further comprising wherein the first neural network is trained by computing q-values for all possible actions, randomly selecting an action as an optimal action with an optimal q-value, generating a reward of the selected optimal action, sampling a set of selected optimal actions, and updating weight parameters of the first neural network to minimize distortion loss.

8. An apparatus for end-to-end neural image compression using deep reinforcement learning, the apparatus comprising:
at least one memory configured to store program code; and
at least one processor configured to read the program code and operate as instructed by the program code, the program code comprising:
encoding code configured to cause the at least one processor to encode an input;
first generating code configured to cause the at least one processor to generate a plurality of encoded representations of the input;
second generating code configured to cause the at least one processor to generate a set of quantization keys, using a first neural network, based on a set of previous quantization states, wherein each quantization key in the set of quantization keys and each previous quantization state in the set of previous quantization states correspond to the plurality of encoded representations;
third generating code configured to cause the at least one processor to generate a set of dequantized numbers representing dequantized representations of the plurality of encoded representations, based on the set of quantization keys, using a second neural network,
wherein the first neural network that is used to generate the set of quantization keys and the second neural network that is used to generate the set of dequantized numbers are updated using a first updating function,
wherein the encoder neural network and the decoder neural network are updated using a second updating function,
wherein the first updating function is different from the second updating function, and
wherein the first neural network used to generate the set of quantization keys, the second neural network used to generate the set of dequantized numbers, an encoder neural network, and a decoder neural network are jointly learned; and decoding code configured to cause the at least one processor to decode a reconstructed output, based on the set of dequantized numbers.

9. The apparatus of claim 8, wherein the plurality of encoded representations of the input are a stream of numbers.

10. The apparatus of claim 8, the program code further comprising:

encoding key code configured to cause the at least one processor to generate a set of encoded quantization keys by entropy encoding the set of quantization keys; and decoding key code configured to cause the at least one processor to generate a set of decoded quantization keys by entropy decoding the set of encoded quantization keys, wherein the set of dequantized numbers are generated based on the set of decoded quantization keys using the second neural network, and wherein the second neural network is a DRL dequantization neural network.

11. The apparatus of claim 8, the program code further comprising:

fourth generating code configured to cause the at least one processor to generate the set of quantization keys using at least one of a block-wise quantization method, an individual quantization method, and a static quantization model method; and fifth generating code configured to cause the at least one processor to generate the set of dequantized numbers using at least one of a block-wise dequantization method, an individual dequantization method, and a static dequantization model method.

12. The apparatus of claim 11, wherein a quantization method of the set of quantization keys is same as a dequantization method of the set of dequantized numbers;

wherein based on the set of quantization keys using the block-wise quantization method as the quantization method, the set of dequantized numbers use the block-wise dequantization method as the dequantization method;

wherein based on the set of quantization keys using the individual quantization method as the quantization method, the set of dequantized numbers use the individual dequantization method as the dequantization method; and wherein based on the set of quantization keys using the static quantization model method as the quantization method, the set of dequantized numbers use the static dequantization model method as the dequantization method.

13. The apparatus of claim 8, further comprising state generating code configured to cause the at least one processor to generate a set of current quantization states, based on the set of previous quantization states and the set of quantization keys, by training the first neural network, wherein the first neural network is a DRL quantization neural network.

14. The apparatus of claim 13, wherein the first neural network is trained by computing q-values for all possible actions, randomly selecting an action as an optimal action with an optimal q-value, generating a reward of the selected optimal action, sampling a set of selected optimal actions, and updating weight parameters of the first neural network to minimize distortion loss.

15. A non-transitory computer-readable medium storing instructions for that, when executed by at least one processor for end-to-end neural image compression using deep reinforcement learning, cause the at least one processor to:

encode an input;

generate a plurality of encoded representations of the input;

generate a set of quantization keys, using a first neural network, based on a set of previous quantization states, wherein each quantization key in the set of quantization keys and each previous quantization state in the set of previous quantization states correspond to the plurality of encoded representations;

generate a set of dequantized numbers representing dequantized representations of the plurality of encoded representations, based on the set of quantization keys, using a second neural network, wherein the first neural network that is used to generate the set of quantization keys and the second neural network that is used to generate the set of dequantized numbers are updated using a first updating function, wherein the encoder neural network and the decoder neural network are updated using a second updating function, wherein the first updating function is different from the second updating function, and wherein the first neural network used to generate the set of quantization keys, the second neural network used to generate the set of dequantized numbers, an encoder neural network, and a decoder neural network are jointly learned; and decode a reconstructed output, based on the set of dequantized numbers.

16. The non-transitory computer-readable medium of claim 15, wherein the plurality of encoded representations of the input are a stream of numbers.

17. The non-transitory computer-readable medium of claim 15, wherein the instructions, when executed by the at least one processor, further cause the at least one processor to:

generate a set of encoded quantization keys by entropy encoding the set of quantization keys; and generate a set of decoded quantization keys by entropy decoding the set of encoded quantization keys, wherein the set of dequantized numbers are generated based on the set of decoded quantization keys using the second neural network, and wherein the second neural network is a DRL dequantization neural network.

18. The non-transitory computer-readable medium of claim 15, wherein the instructions, when executed by the at least one processor, further cause the at least one processor to:

generate the set of quantization keys using at least one of a block-wise quantization method, an individual quantization method, and a static quantization model method;

generate the set of dequantized numbers using at least one of a block-wise dequantization method, an individual dequantization method, and a static dequantization model method; and wherein a quantization method of the set of quantization keys is same as a dequantization method of the set of dequantized numbers, wherein based on the set of quantization keys using the block-wise quantization method as the quantization method, the set of dequantized numbers use the block-wise dequantization method as the dequantization method, wherein based on the set of quantization keys using the individual quantization method as the quantization method, the set of dequantized numbers use the individual dequantization method as the dequantization method, and wherein based on the set of quantization keys using the static quantization model method as the quantization method, the set of dequantized numbers use the static dequantization model method as the dequantization method.

19. The non-transitory computer-readable medium of claim 15, wherein the instructions, when executed by the at least one processor, further cause the at least one processor to generate a set of current quantization states, based on the set of previous quantization states and the set of quantization keys, by training the first neural network, wherein the first neural network is a DRL quantization neural network.

20. The non-transitory computer-readable medium of claim 19, wherein the first neural network is trained by computing q-values for all possible actions, randomly selecting an action as an optimal action with an optimal q-value, generating a reward of the selected optimal action, sampling a set of selected optimal actions, and updating weight parameters of the first neural network to minimize distortion loss.

* * * * *